C. CADWELL.
Harvester Cutter.
No 61,394.
Patented Jan. 22, 1867.
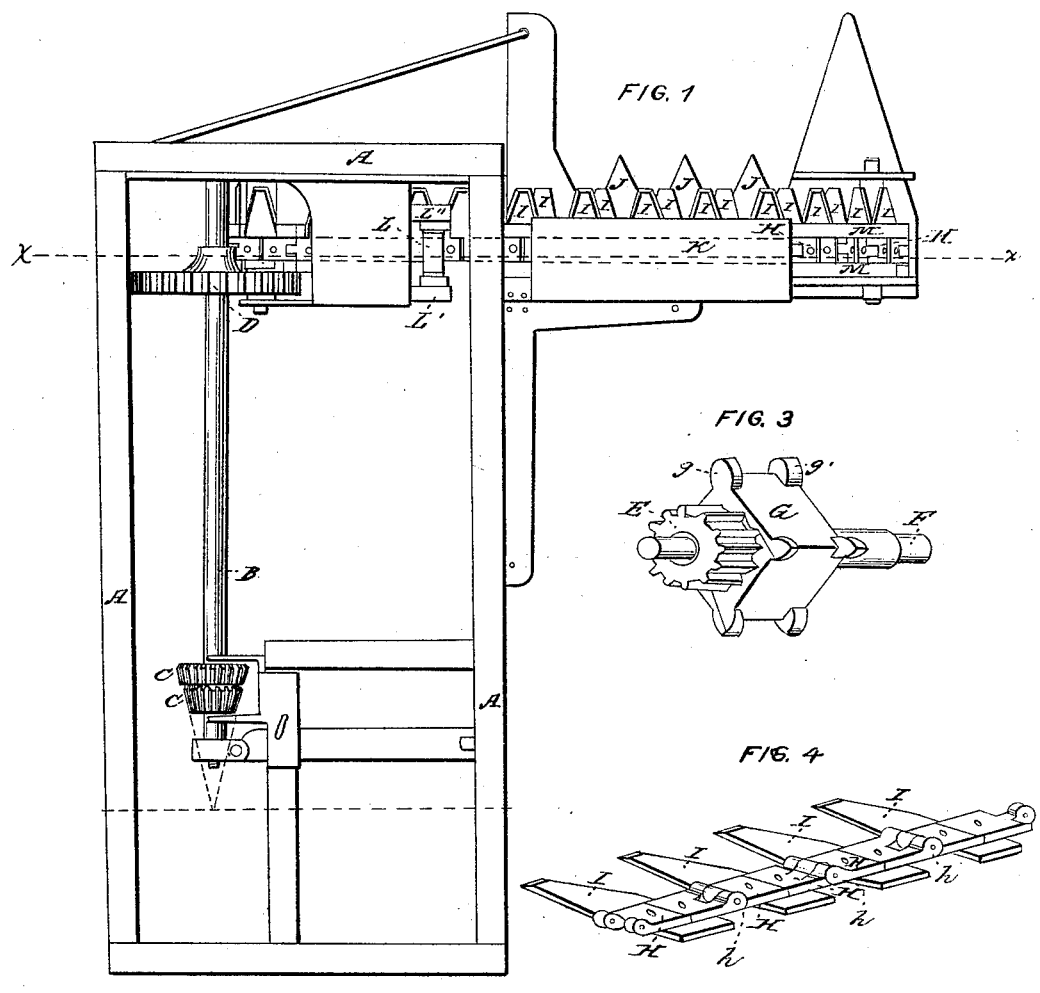
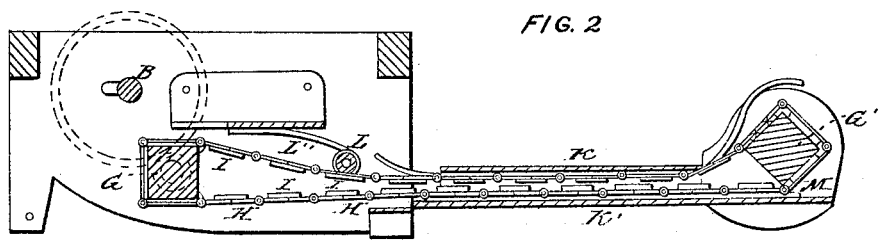
WITNESSES:
James L. Ennis
Charles A. Pettit
INVENTOR:
Caleb Cadwell
By Munn & Co
Attorneys

UNITED STATES PATENT OFFICE.

CALEB CADWELL, OF WAUKEGAN, ILLINOIS.

IMPROVEMENT IN HARVESTER-CUTTERS.

Specification forming part of Letters Patent No. 61,394, dated January 22, 1867.

*To all whom it may concern:*

Be it known that I, CALEB CADWELL, of Waukegan, in the county of Lake and State of Illinois, have invented a new and useful Improvement in Rotary Cutters for Harvesters; and I do hereby declare the following to be a full, clear, and exact description of the same, reference being had to the accompanying drawings, which are made a part of this specification, and in which—

Figure 1 is a plan of a portion of a harvester with my invention applied. Fig. 2 is a vertical transverse section of the same, the line $x$ $x$, Fig. 1, indicating the plane of section. Fig. 3 is a detached perspective view of a portion of the rotary driving-block and pinion. Fig. 4 is a detached perspective view of a portion of the rotary cutter.

Similar letters of reference indicate corresponding parts in the several figures.

This invention consists in a novel method of constructing and operating a rotary cutting device, which consists of a chain of cutting-teeth connected together by links, with the joints of the links located between the adjacent cutters, and the whole driven in such a manner that the teeth glide past and in contact with each other, and over the guards of the finger-beams, the same thus having a cutting action similar to that of shears, while the motion is of such a positive and continuous character as to insure the most effective operation.

The following detail description will enable others skilled in the art to which my invention appertains to fully understand and use the same.

In the accompanying drawings, A represents a frame, which is to be mounted within the main frame of a harvester, and which affords the means of attaching the rotary cutting apparatus and the devices employed in connection therewith. B represents a driving-shaft, which receives motion from the carrying-wheels of the harvester through the pinions C C, which are adjustable and of different size, in order that either may be brought into requisition or thrown out of gear, at will, so as to vary the speed of the driving-shaft B.

On the shaft B and near its forward end is mounted a driving cog-wheel, D, which gears with and rotates a pinion, E, keyed upon the shaft F, which carries a cubical or angular driving-block, G, (see Fig. 3,) said shaft F being suitably journaled at the forward end of the frame A, and beneath the cog-wheel D.

The rotary cutting device consists of an endless chain of links, H, and cutting-teeth, I, (see Fig. 4,) and is driven by the angular block G, which propels the chain by acting against the sides of the teeth I, as will be understood by reference to Fig. 2. To enable the block G thus to act upon the chain of cutters, the teeth I occupy the inner position, and the links the outer, and the joints $h$, whereby the links are connected together, are made to come between the adjacent teeth, as seen in Figs. 2 and 4. The cutter also rotates about another block, G', which is suitably journaled at the outer end of the finger-beam, and holds the cutter off from the machine, so as to cause it to traverse the upper surface of the guards J.

The cutter H I is embraced between the top plate K and finger-beam K', and is held against vertical displacement by means of the guide-bars M M', two of which are secured to the under surface of the top plate K, and two to the upper surface of the finger-beam K'. The links H are adapted to slide between these guides M M', as seen in Fig. 1, and the cutters are thereby confined in their proper working position as they move continuously upon the guards J.

L represents a roller attached to the end of springs L', and made to bear against the upper part of the cutter H I, at a point between the inner ends of the guide M M' and the driving-block G. This roller is employed to keep the chain tight, or, in other words, to apply such tension as is necessary to give a positive steady motion to the cutters. This roller L, being formed with enlargements at its ends, is also adapted to serve as a guide to prevent the horizontal displacement of the cutters; and said roller is to be made adjustable in order to vary its pressure.

The projections $g$ on the corners of the block G not only serve to propel the teeth I, but prevent the cutter H I from slipping off the same; and the block G' is formed with like projections for the same purpose.

The teeth I are formed separately, and riveted to the links H, as seen in Fig. 4; and one of the joints is made so that it can be readily unlocked or disconnected, in order to permit the chain to be removed when it is desired to grind or repair the cutters.

It is contemplated to form the pinion E in two or more parts of different diameter, and to provide the driving-shaft F with a feather to enable the wheel thus formed to be slid on the shaft, so as to throw either part of the pinion in gear with the driving-wheel D, and thus vary the speed of the cutter at will.

Having thus described my invention, the following is what I claim as new herein and desire to secure by Letters Patent:

1. The rotary cutter consisting of the teeth I and links H, in combination with the blocks G G' g, when constructed and arranged in the manner and for the purpose specified.

2. The arrangement of the cutter H I, blocks G G', guides M M', roller L, spring L', gearing D E, shaft B, and bevel-pinions C C, as herein described and represented.

CALEB CADWELL.

Witnesses:
W. H. ELLIS,
W. W. HASTINGS.